United States Patent
Nara et al.

(10) Patent No.: US 8,024,757 B2
(45) Date of Patent: Sep. 20, 2011

(54) DIGITAL BROADCAST RECEIVER AND BACKUP METHOD

(75) Inventors: Kaoru Nara, Tokyo (JP); Makoto Suzuki, Saitama (JP)

(73) Assignee: Sony Corporation, Tokyo (JP)

( * ) Notice: Subject to any disclaimer, the term of this patent is extended or adjusted under 35 U.S.C. 154(b) by 1115 days.

(21) Appl. No.: 10/432,659

(22) PCT Filed: Sep. 20, 2002

(86) PCT No.: PCT/JP02/09713
§ 371 (c)(1),
(2), (4) Date: Nov. 3, 2003

(87) PCT Pub. No.: WO03/030174
PCT Pub. Date: Apr. 10, 2003

(65) Prior Publication Data
US 2004/0141724 A1     Jul. 22, 2004

(30) Foreign Application Priority Data

Sep. 27, 2001  (JP) .................... 2001-296907

(51) Int. Cl.
 *G06F 3/00* (2006.01)
 *G06F 13/00* (2006.01)
 *H04N 5/445* (2006.01)
(52) U.S. Cl. ............ 725/58; 725/53; 725/134; 725/142; 707/640; 386/279
(58) Field of Classification Search ............ 386/46, 386/52, 83, 124–125, 278, 286; 725/39–47, 725/134, 142, 58; 707/640
See application file for complete search history.

(56) References Cited

U.S. PATENT DOCUMENTS

| | | | | |
|---|---|---|---|---|
| 5,126,851 | A * | 6/1992 | Yoshimura et al. | 386/60 |
| 6,266,478 | B1 * | 7/2001 | Yoshio et al. | 386/46 |
| 6,442,327 | B1 * | 8/2002 | Yamada et al. | 386/46 |
| 6,460,055 | B1 * | 10/2002 | Midgley et al. | 707/204 |
| 6,643,450 | B1 * | 11/2003 | deCarmo | 386/94 |
| 6,760,918 | B2 * | 7/2004 | Rodriguez et al. | 725/134 |
| 6,952,521 | B2 * | 10/2005 | Kelly et al. | 386/52 |
| 2001/0024562 | A1 | 9/2001 | Nomura et al. | |
| 2001/0033736 | A1 * | 10/2001 | Yap et al. | 386/46 |
| 2002/0061185 | A1 * | 5/2002 | Hirabayashi et al. | 386/94 |
| 2002/0131760 | A1 * | 9/2002 | Hirai et al. | 386/52 |
| 2002/0184638 | A1 * | 12/2002 | Agnihotri et al. | 725/89 |
| 2009/0150937 | A1 * | 6/2009 | Ellis et al. | 725/46 |

(Continued)

FOREIGN PATENT DOCUMENTS

EP     1 014 715     6/2000

(Continued)

*Primary Examiner* — Brian Pendleton
*Assistant Examiner* — Nnenna Ekpo
(74) *Attorney, Agent, or Firm* — Frommer Lawrence & Haug LLP; William S. Frommer; Thomas F. Presson

(57) ABSTRACT

A digital broadcast receiver capable of reducing time and labor to back-up contents recorded on one recording medium to another recording medium. A digital broadcast receiver extracts the contents recorded, out of order, on a first recording medium by an extracting unit according to the titles or genres recorded in a content list, and automatically rearranges the extracted contents using an arranging unit according to video-recording date-and-hour recorded in the content list, for recording as a content list onto a second recording medium (300).

11 Claims, 10 Drawing Sheets

U.S. PATENT DOCUMENTS

2009/0310937 A1 * 12/2009 Ellis et al. .................. 386/83

FOREIGN PATENT DOCUMENTS

| | | |
|---|---|---|
| EP | 1 047 074 | 10/2000 |
| EP | 1 067 788 | 1/2001 |
| JP | 5-91455 | 4/1993 |
| JP | 6-215533 | 8/1994 |
| JP | 7-169247 | 7/1995 |
| JP | 9-50360 | 2/1997 |
| JP | 9-130736 | 5/1997 |
| JP | 11-250630 | 9/1999 |
| JP | 11-306615 | 11/1999 |
| JP | 11-355699 | 12/1999 |
| JP | 2000-184230 | 6/2000 |
| JP | 2000-235780 | 8/2000 |
| JP | 2001-257982 | 9/2000 |
| JP | 2001-8158 | 1/2001 |
| JP | 2001-8163 | 1/2001 |
| JP | 2001-24980 | 1/2001 |
| JP | 2001 218157 | 8/2001 |
| JP | 2002-100168 | 4/2002 |
| JP | 2002-290892 | 10/2002 |

* cited by examiner

FIG. 5

LIST SUMMARY

AVHDD

| | TITLE | GENRE | VIDEO/AUDIO-RECORDING DATE-AND-TIME |
|---|---|---|---|
| 1 | SOCCER | SPORT | '01 03/01 20:00 |
| 2 | AB (FIRST STORY) | DRAMA | '01 03/05 21:00 |
| 3 | TENNIS | SPORT | '01 03/04 13:00 |
| 4 | CDE | DRAMA | '01 03/14 20:00 |
| 5 | AB (THIRD STORY) | DRAMA | '01 03/19 21:00 |
| 6 | ○○○○ | ANIMATION | '01 03/02 19:00 |
| 7 | SUMO WRESTLING | SPORT | '01 03/01 16:00 |
| 8 | AB (SECOND STORY) | DRAMA | '01 03/12 21:00 |
| 9 | ○▲□ | ANIMATION | '01 03/03 19:00 |

DELETE

BACKUP

| | TITLE |
|---|---|
| 1 | SOCCER |
| 2 | AB (FIRST STORY) |
| 3 | TENNIS |
| 4 | CDE |
| 5 | AB (THIRD STORY) |
| 6 | ○○○○ |
| 7 | SUMO WRESTLING |
| 8 | AB (SECOND STORY) |
| 9 | ○▲□ |

AVHDD

D-VHS (1)

| | TIITLE |
|---|---|
| 1 | AB (FIRST STORY) |
| 2 | AB (SECOND STORY) |
| 3 | AB (THIRD STORY) |

| | TITLE |
|---|---|
| | AVHDD |
| 1 | CDEF |
| 2 | AB (SECOND STORY) |
| 3 | ○×○ |

| | TITLE |
|---|---|
| | D-VHS (1) |
| 1 | AB (FIRST STORY) |
| 2 | ▲▲▲ |
| 3 | AB (THIRD STORY) |

| | TITLE |
|---|---|
| | D-VHS (2) |
| 1 | AB (FIRST STORY) |
| 2 | AB (SECOND STORY) |
| 3 | AB (THIRD STORY) |

US 8,024,757 B2

DIGITAL BROADCAST RECEIVER AND BACKUP METHOD

TECHNICAL FIELD

The present invention relates to a digital broadcast receiver for receiving a digital broadcast and a backup method for backing up a content recorded on a recording medium to another recording medium.

BACKGROUND ART

Amid the advancement of television broadcast digitalization including Japanese terrestrial broadcast digitalization targeted at 2003, there are recent advents of hard disk audio/video recording apparatuses (AVHDD), digital video recorders (D-VHS) and the like, to record digital broadcasts. These apparatuses are connectable with a digital broadcast receiver by an IEEE1394 (Institute of Electrical and Electronics Engineers 1394) terminal, which can record the digital broadcast received by a digital broadcast receiver.

Meanwhile, there is a recent advent of a digital broadcast receiver incorporating an AVHDD for video recording. Generally, the AVDHH temporarily stores contents and thereafter backs up a user-selected content onto a D-VHS digital videotape.

However, in the above method, manual operation must be made in order to back up related ones of recorded contents, making it difficult to find out a related recorded content. Also, in the case that the capacity of a recording medium reaches a limit in the course of backup, backup is ended at that time.

The present invention has been made in view of such points, and it is an object to provide a digital broadcast receiver capable of automatically backing up related ones of recorded contents.

Also, another object of the invention is to provide a backup method capable of automatically backing up related contents.

DISCLOSURE OF THE INVENTION

The present invention provides, in order to solve the above problem, in a digital broadcast receiver for receiving a digital broadcast, a digital broadcast receiver characterized by comprising: extracting means for automatically extracting a plurality of contents recorded, out of order, on a recording medium by a first attribute of the contents; and arranging means for automatically rearranging contents extracted by the extracting means according to a second attribute of extracted contents, for recording onto a second recording medium.

Herein, the digital broadcast receiver of the invention has the extracting means and the arranging means, to automatically arranges, with relations, the contents recorded out of order on the recording medium, for recording onto another recording medium.

Meanwhile, there is provided in a backup method for backing up contents recorded on a first recording medium onto a second recording medium, a backup method characterized by: automatically extracting contents recorded, out of order, on the first recording medium according to a first attribute of the contents; and automatically rearranging extracted contents according to a second attribute of the extracted contents, for recording onto a second recording medium.

Herein, the contents recorded on the first recording medium are extracted, according to the first attribute, of related contents which are rearranged according to the second attribute and backed up onto a second recording medium, whereby related contents are automatically backed up to another recording medium.

BRIEF DESCRIPTION OF THE DRAWINGS

FIG. 5 is an example of displaying a list of the contents recorded on an AVHDD, on the display of the digital television set.

BEST MODE FOR CARRYING OUT THE INVENTION

Hereunder, an embodiment of the present invention will be explained with reference to the drawings.

Figure 1:
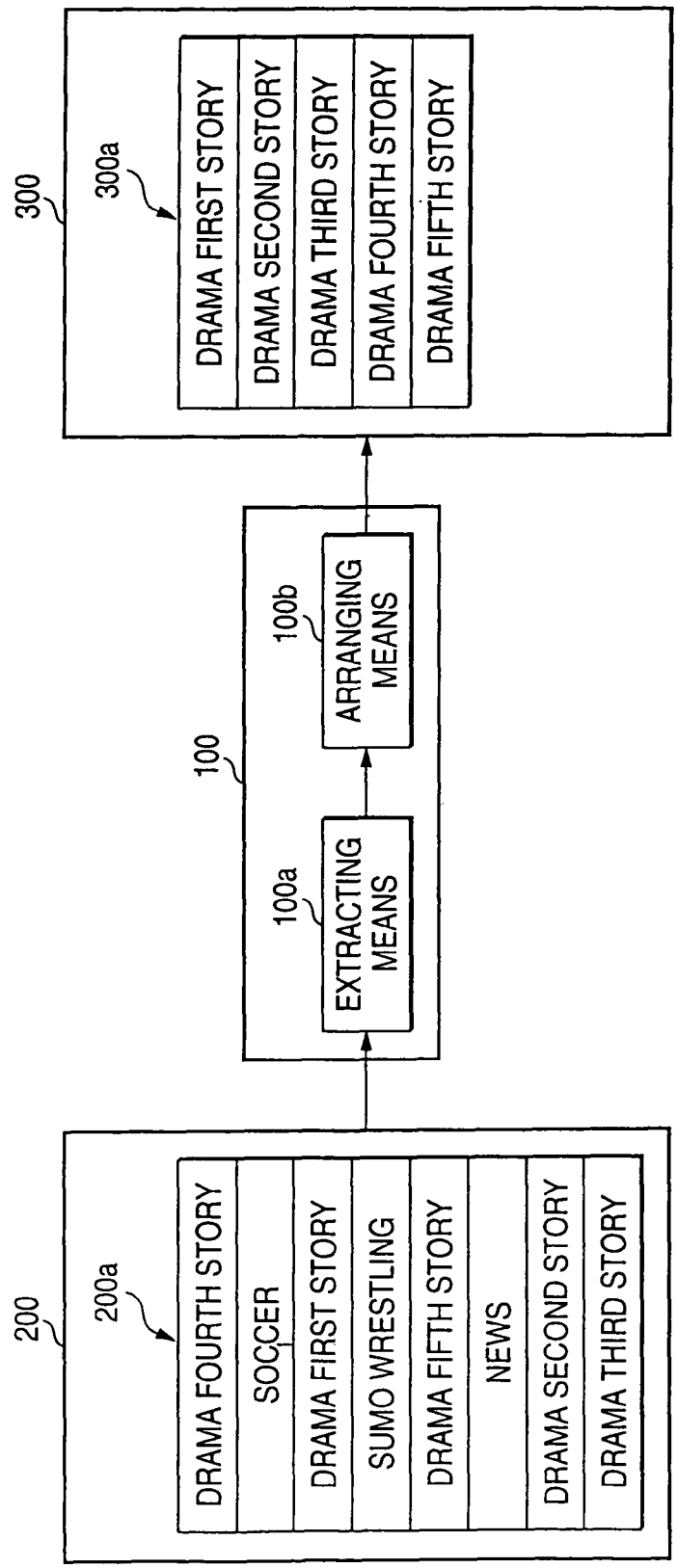
FIG. 1 is a principle diagram showing a principle of the present invention.

FIG. 1 is a principle diagram of the invention.

A digital broadcast receiver 100 of the invention comprises extracting means 100a for automatically extracting the contents recorded, out of order, in a first recording medium 200 by the titles or genres recorded in a content list 200a, and arranging means 100b for automatically rearranging the extracted contents according to the video-recording date-and-hour recorded in the content list 200a and recording as a content list 300a to a second recording medium 300.

By the configuration as in the above, the digital broadcast receiver 100 of the invention can extract, by the extracting means 100a, the contents recorded, out of order, in the first recording medium 200 on the basis of each title or genre recorded in the content list 200a, and automatically rearrange, by the arranging means 100b, the extracted contents according to the recording date-and-time recorded in the content list 200a and automatically record as a content list 300a to the second recording medium 300.

Next, a concrete embodiment of the invention is explained.

Figure 2:
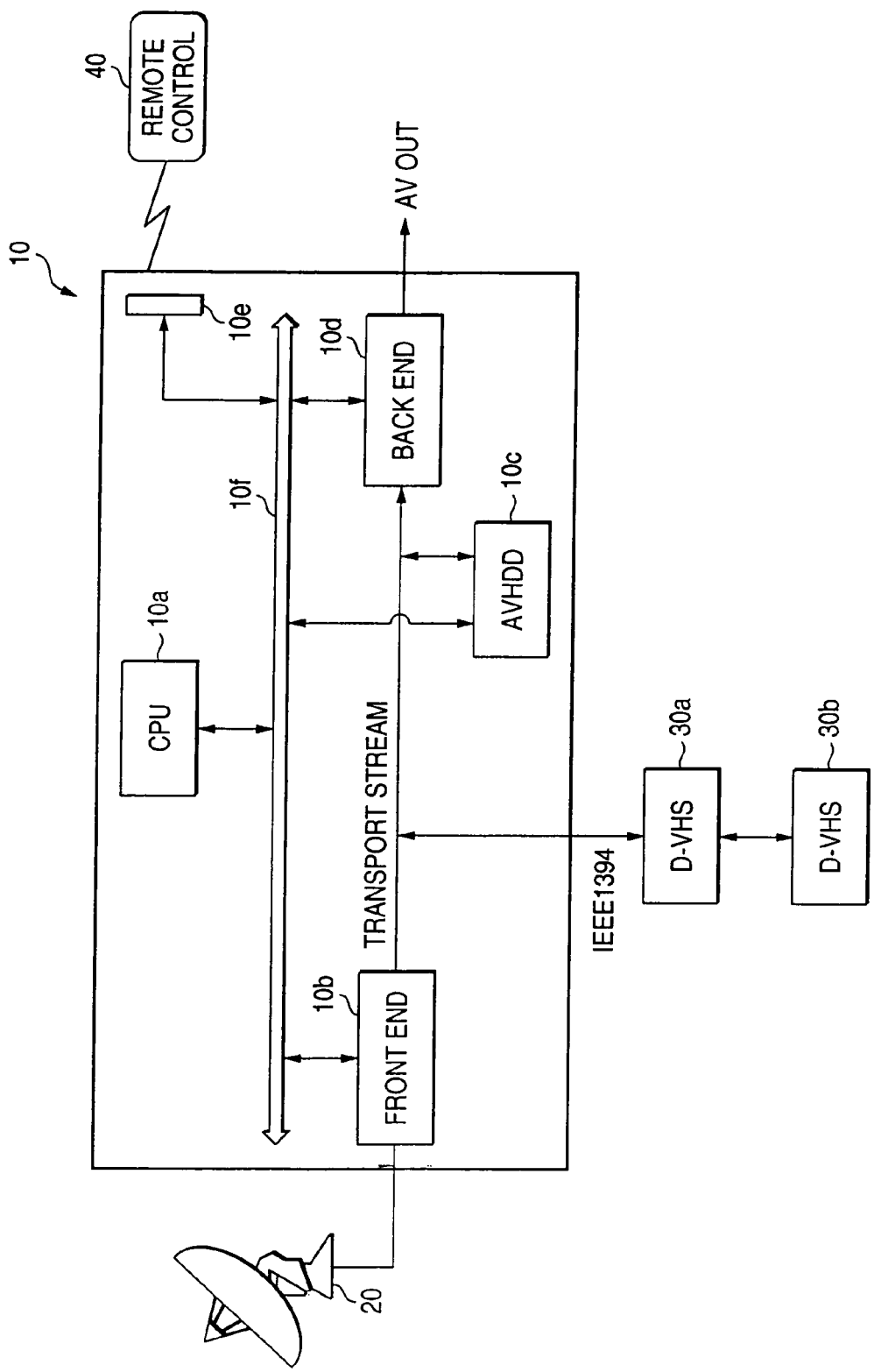
FIG. 2 is a block diagram showing a digital broadcast receiver of the invention and its peripheral units.

FIG. 2 is a block diagram showing a digital broadcast receiver of an embodiment of the invention and its peripheral unit.

A digital broadcast receiver 10 of the embodiment of the invention comprises a front end 10b connected to an external antenna 20 and including a not-shown tuner and the like, a back end 10d connected to the front end 10b and including a not-shown decoder or the like to have a function to output a video signal and audio signal to a digital television set (not shown), an AVHDD 10c as an integration-type hard disk drive connected to a data line between the front end 10b and the back end 10d, a remote-control light-receiving section 10e for receiving a signal from a remote-control transmitter 40, and a CPU (Central Processing Unit) 10a connected, through a bus 10f, to the front end 10b, the back end 10d, the AVHDD 10c and the remote-control light-receiving section 10e.

The output of the digital broadcast receiver 10 is supplied to a not-shown digital television set, where a required image is displayed on its display.

Meanwhile, at the outside of the digital broadcast receiver 10, there are two digital videos D-VHS 30a and D-VHS 30b connected in a daisy-chain type through a signal line, e.g. of IEEE1394 format, to take out and record the digital broadcast data existing in a transport stream form between the front end 10b and the back end 10d.

By making such a configuration, the CPU 10a recognizes a title, genre and video-recording date-and-hour of a content recorded in the recording medium of the D-VHS 30a, 30b connected via the AVHDD 10c and IEEE1394 terminal by an application program stored in a not-shown ROM (Read Only Memory). Furthermore, such operations are made possible that, for example, reference is made to a genre to automatically take a drama out among the contents recorded, out of order, in the AVHDD 10c and arrange and backup it in a video-recording date-and-hour order to a digital videotape of the D-VHS 30a.

Incidentally, although, in the above explanation, the connection forms of the recording units based on the AVHDD 10c and D-VHS 30a, 30b are of the daisy-chain type, various connection forms may be taken including a star type, tree type and the like. Meanwhile, there is no limitation in respect of connection length and connection count.

Hereunder, a method of backup is explained.

Figure 3:
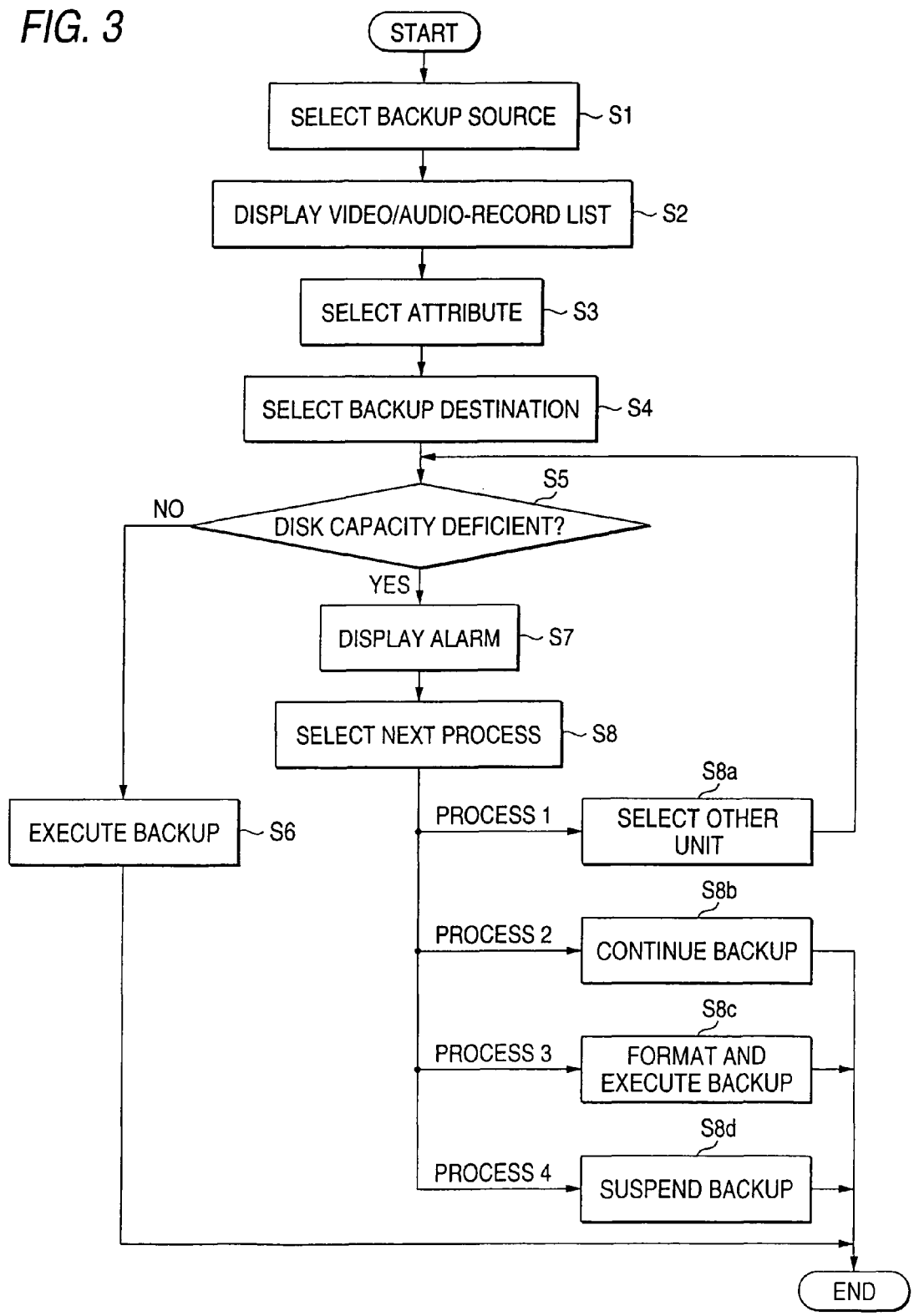
FIG. 3 is a flowchart showing a backup method.

FIG. 3 is a flowchart showing a method of backup. Incidentally, S1, S2, . . . in FIG. 3 show process step numbers.

Explanation is made, below, on each of steps separately.

S1: selecting a backup source.

The user notifies the digital broadcast receiver 10 of a move to a backup mode, by using the remote-control transmitter 40 for example.

Figure 4:
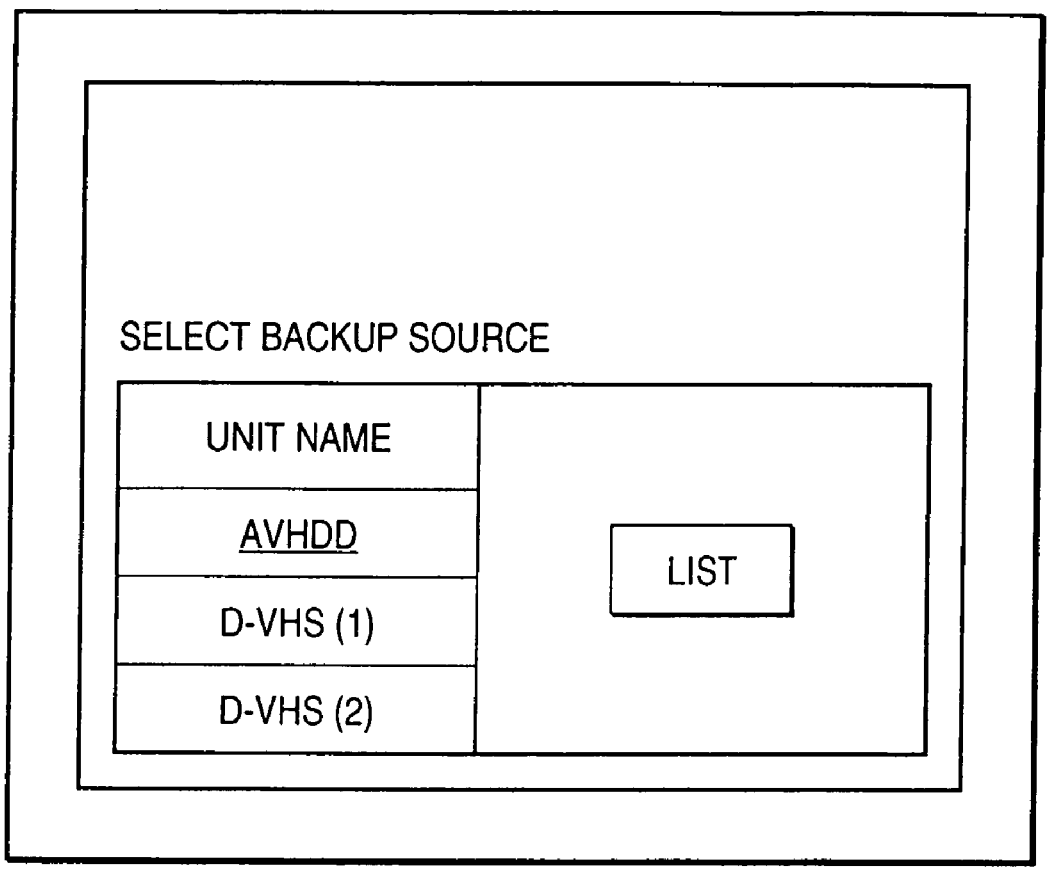
FIG. 4 is an example of a screen to be displayed on a display of a digital television set when moved to a backup mode.

FIG. 4 is a screen example to be displayed, at that time, on a display of the digital television set. On the display, displayed are AVHDD 10c built in the digital broadcast receiver 10, and "AVHDD", "D-VHS(1)" and "D-VHS(2)" as machine names of the D-VHS 30a, 30b connected by the IEE1394.

Also, displayed is a list button to list-display the titles of the contents recorded in the respective recording mediums. Next, a cursor (underline) is moved by using the remote control 40, to select of which recording medium a content is to be backed up. Furthermore, the list button is selected to instruct for list display.

Herein, explanation is made on an example of a process within the digital broadcast receiver 10 to be executed in step S1, with reference to FIG. 2.

In case the user operates the remote control transmitter 40 to send a signal for moving to a backup mode, the CPU 10a recognizes the AVHDD 10c as an incorporated hard disk and the D-VHS 30a and D-VHS 30b connected by the IEE1394 from a signal received through the remote-control light-receiving section 10e on the basis of an application program stored in a not-shown ROM or the like, and, at the same time, recognizes the content recorded in the AVHDD 10c and the content recorded in the D-VHS 30a and D-VHS 30b. A recognition result is added to a content now under reproduction by the back end 10d and outputted onto the digital television set as in FIG. 4.

The CPU 10a receives a signal through the remote-control light-receiving section 10e each time the user uses the remote-control transmitter 40, and carries out a predetermined operation according to an application program depending upon an input by the user, to output a result thereof onto the not-shown digital television set through the back end 10d. This operation is similar also in the below step, and hence omitted.

S2: displaying a video-record list recorded.

Herein, the list of contents recorded in the recording medium at the backup source designated in step S1 is displayed on the display of the digital television set.

FIG. 5 is an example displaying the list of contents recorded in the AVHDD 10c on the display of the digital television set. As in the figure, there are displayed titles, genres, video-recording date-and-hour in the list. Such a list has been recorded as a content list on each recording medium.

Meanwhile, on the digital-television screen shown in FIG. 5, there are displayed the buttons of "Delete" and "Backup", for example. The user, if selecting "Delete" by the remote-control transmitter 40, is allowed to select and delete, for example, a content to be deleted in the list. Selecting "Backup" proceeds to step S3.

S3: selecting an attribute for content extraction.

Figure 6:
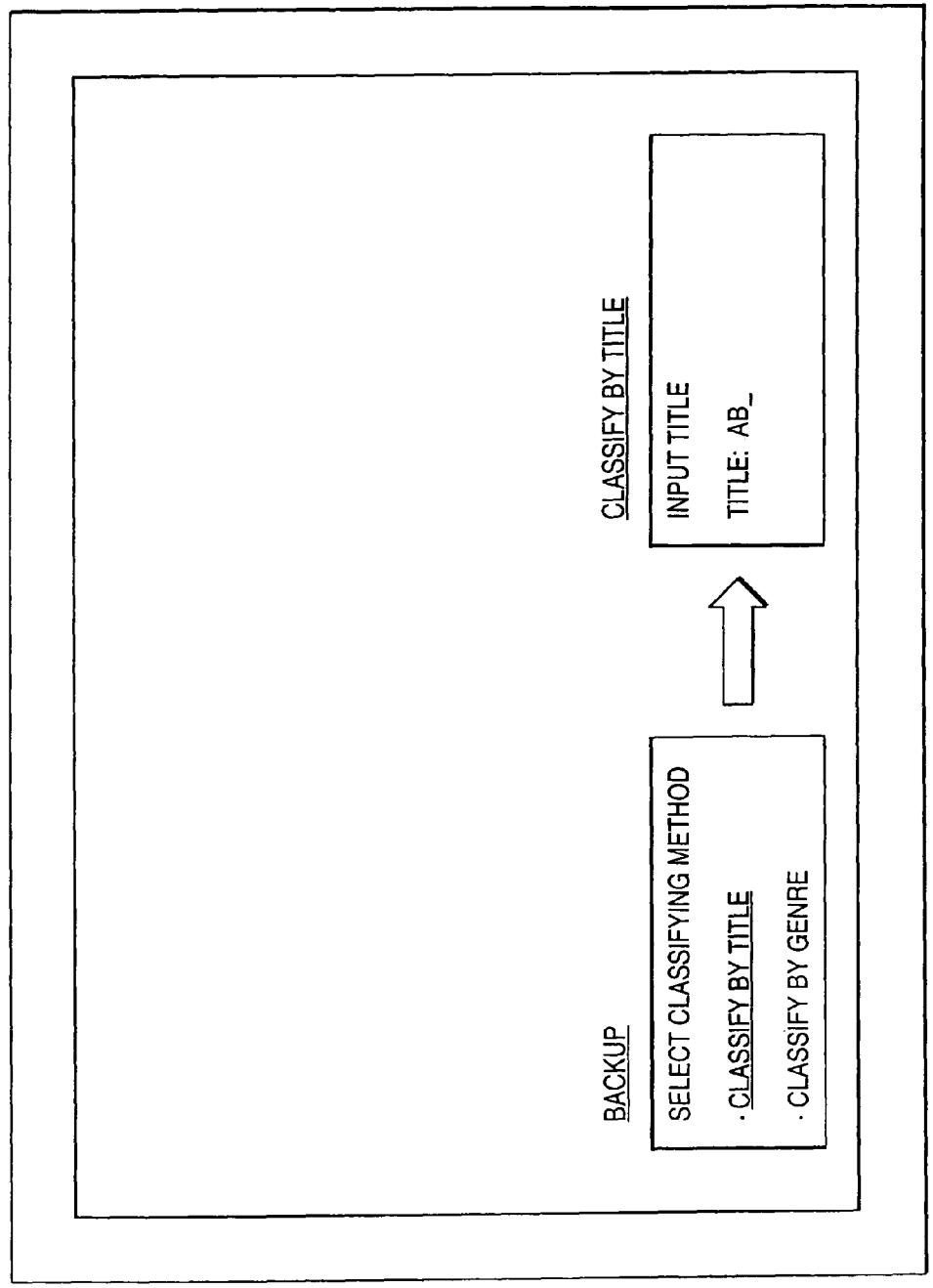
FIG. 6 is an example of a screen to be displayed on the display of the digital television set when selecting a classification of contents.

FIG. 6 is an example of a screen to be displayed on the digital-television display when the user selects "Backup" in step S2. Herein, the user determines which attribute of title or genre the content is to be classified and extracted, and makes a selection by the remote-control transmitter 40. In FIG. 6, "Classify by Title" is selected.

In the case of selecting title, as shown in FIG. 6, the user then inputs a title name by the remote-control transmitter 40. The CPU 10a searches through the content list of the recording medium selected in step S1 and extracts a content meeting the title name.

Meanwhile, in the case of selecting genre, then the user selects a genre name, such as sport, drama or animation, by the remote-control transmitter 40. The CPU 10a searches through a content list of the recording medium selected in step S1 according to a selected genre name, and extracts a content meeting the genre name.

The information of the extracted content is temporarily stored to a recording unit such as a not-shown RAM, in preparatory for backup.

S4: selecting a backup destination.

Figure 7:
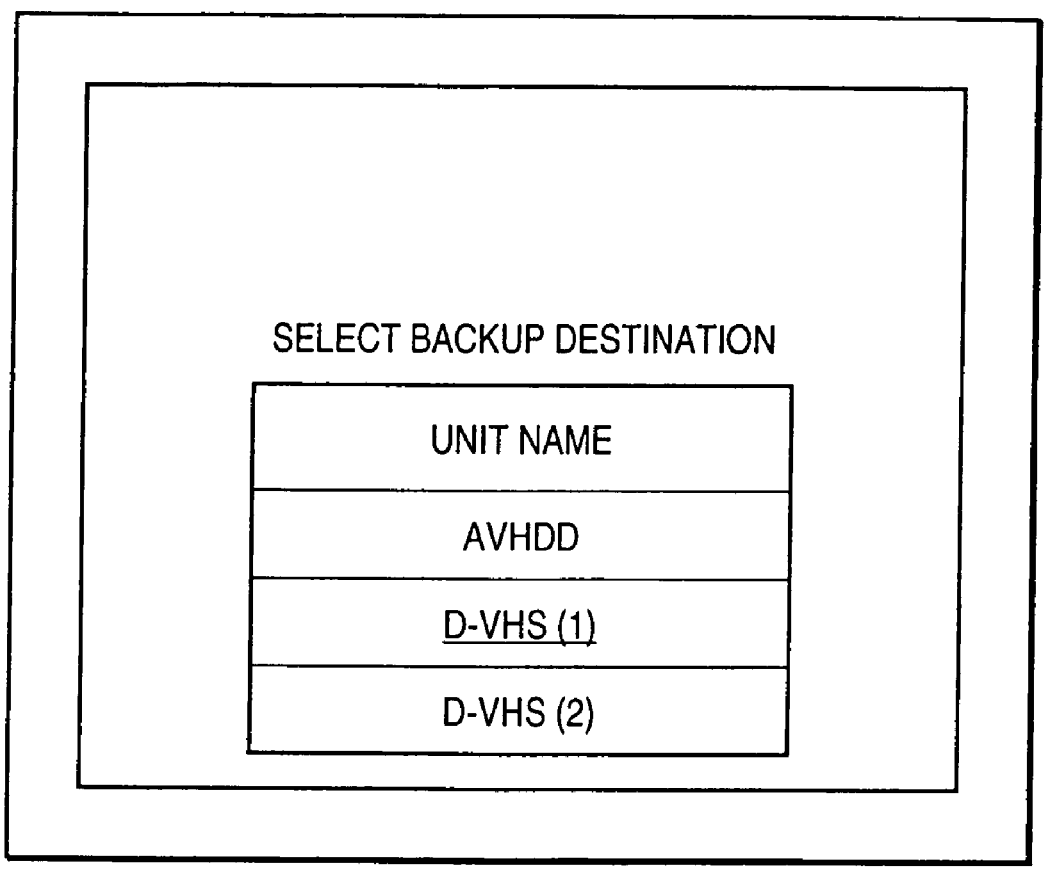
FIG. 7 is an example of a screen to be displayed on the display of the digital television set when selecting a backup destination.

FIG. 7 shows an example of a screen to be displayed on a digital television display when selecting a backup destination. As in the figure, there is shown a machine name of the AVHDD 10c or the D-VHS 30a, 30b, so that the user selects any one by the remote-control transmitter 40.

S5: examining for an available disk capacity of the backup destination.

The CPU 10a examines for an available disk capacity of a recording medium as a backup destination selected in step S4. In case the available disk capacity is sufficient, step S6 is proceeded to, while, in case deficient, step S7 is proceeded to.

S6: executing backup.

Because, in step S5, the backup destination the user has designated is sufficient in available disk capacity, the content extracted from the backup-destination recording medium selected in step S1 by the attribute selected in step S3 is automatically recorded in a video-recording date-and-hour order onto the backup-destination recording medium designated in step S4, thus ending the backup operation.

Figure 8:
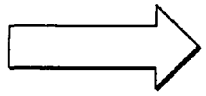
FIG. 8 is a figure showing a manner that contents have been extracted on title from a content list recorded in the AVDHH shown in FIG. 4 and backed up to a D-VHS.

FIG. 8 is a diagram showing a manner at a time that a content is extracted by title from the content list recorded on the AVHDD 10c shown in FIG. 5 and backed up to the D-VHS 30*a*. In the case that a title is selected as attribute in step S3 to input "AB" for example, the content meeting the title is automatically arranged in a video-recording date-and-hour order to the backup-destination recording medium designated in step S4, herein D-VHS 30*a*, thus being recorded as in the figure.

S7: displaying an alarm.

Because the backup-destination recording medium designated by the user in step S5 was confirmed insufficient in available disk capacity, an indication of that fact is displayed on the digital television display.

Figure 9:
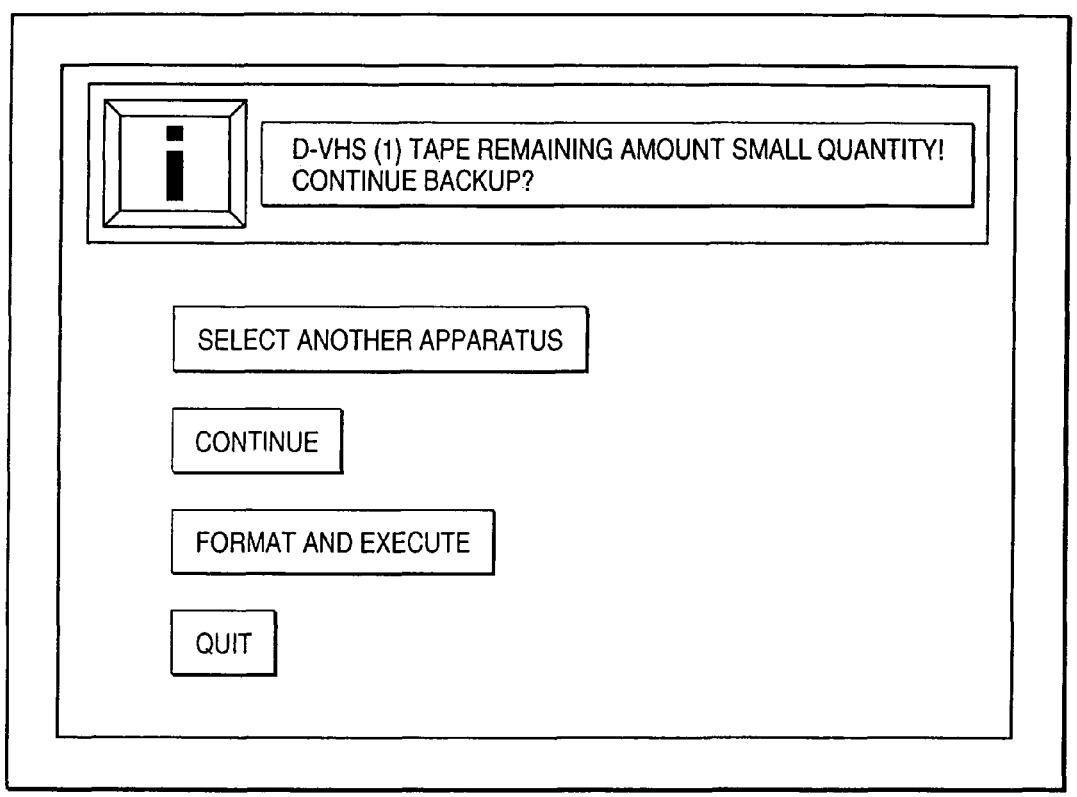
FIG. 9 is an example of displaying a fact that the tape remaining amount of a D-VHS digital tape is deficient, on the display of the digital television set.

FIG. 9 is an example that the fact a digital tape of the D-VHS 30*a* is insufficient in tape remaining amount is displayed on the digital television display. In the figure, the process to be next done is shown four simultaneously with an alarm text.

S8: selecting the next process.

The user selects any one among, for example, the four processes shown in FIG. 9.

For example, in the case of selecting another apparatus (S8*a*), step S5 is again returned to, to examine for an available disk capacity of a unit the user has selected.

In the case of selecting to continue backup (S8*b*), there is a possibility that the disk capacity run out in the course of backup. However, backup operation is continued as it is, to end the process at a time the disk capacity runs out.

At this time, an error message may be displayed.

In the case that selection is to format and execute backup (S8*c*), the recording medium designated in step S4 is formatted to execute backup, and thereafter the process is ended.

In the case of selecting to suspend backup (S8*d*), backup operation is suspended to end the process.

As described above, by automatically extracting and rearranging the contents according to a content attribute recorded in a recording medium, the user is released from the troublesomeness of manual operation and allowed to back up, in a brief time, a content of a genre or title he or she seeks, in a recording date-and-hour order, onto another recording medium.

Incidentally, the above explained with one backup-destination recording medium, this is not limited to.

Figure 10:
FIG. 10 is a figure showing a manner of backing up the contents recorded on AVHDD and D-VHS digital video tapes to another D-VHS digital video tape.

FIG. 10 is a diagram showing a manner that the contents recorded on two recording mediums, or digital videotapes of the AVHDD 10*c* and D-VHS 30*a*, are backed up to one recording medium, or a digital video tape of the D-VHS 30*b*. For example, dramas can be extracted from the contents recorded on the AVHDD 10*c* and D-VHS 30*a* and backed up to in a video-recording date-and-hour order onto the D-VHS 30*b*.

Meanwhile, although, in the above explanation, a backup-destination recording medium was selected by the user, selection may be made automatically. On this occasion, the digital broadcast receiver examines for a content capacity an available storage capacity of a recording medium for backup, and selects an optimal destination of backup.

Meanwhile, although, in the above explanation, the digital broadcast receiver controls backup operation and instructs an backup operation to another recording medium, the unit other than the digital broadcast receiver, such as the AVHDD or D-VHS, may control backup operation to operate the other unit or recording medium.

As explained in the above, in the present invention, the digital broadcast receiver has means that recognizes a content attribute recorded on a recording medium, and automatically extracts and rearranges the contents recorded, out of order, in the recording medium according to the attribute thereby backing up them to another recording medium. Accordingly, the user is allowed to carry out backup with reduced time and labor.

Meanwhile, in the method of backup in the invention, because contents are automatically extracted and rearranged according to a content attribute recorded on a recording medium and backed up to another recording medium, the user is released from the troublesomeness of manual operation and the user can carry out backup with reduced time and labor.

The invention claimed is:

1. A digital broadcast receiver comprising:
   storing means for storing a plurality of contents of a digital broadcast, and storing attributes of the contents on a first recording medium,
      wherein the stored attributes of the contents include a genre name of each content and a title name of each content;
   extracting means for automatically extracting contents from a plurality of the contents recorded out of a video-recording date-and-hour order on the first recording medium based on a user-input attribute input by a user,
      wherein, when the user-input attribute is a genre name of the content, extracting means extracts the content having the same genre name as the genre name input by the user, and when the user-input attribute is a title name of the content, extracting means extracts the content having the same title name as the title name input by the user; and
   selecting means for selecting a second recording medium;
   examining means for examining for an available disk capacity of the second recording medium and for determining whether the available disk capacity of the second recording medium is sufficient for contents extracted by the extracting means;
   arranging means for automatically rearranging the extracted contents, recorded out of the video-recording date-and-hour order and meeting the user-input attribute, in the video-recording date-and-hour order without a user's manual operation, for recording onto the second recording medium, when the available disk capacity of the second recording medium is sufficient,
      wherein the video-recording date-and-hour indicates when the extracted content is recorded.

2. The digital broadcast receiver according to claim 1, wherein the digital broadcast receiver has a plurality of recording media; and
   wherein the extracting means automatically extracts a plurality of contents from said plurality of recording media.

3. The digital broadcast receiver according to claim 1, further comprising:
   displaying means for displaying said plurality of contents extracted by said particular genre or title input by user.

4. The digital broadcast receiver according to claim 1, wherein one or both of the recording media is a hard disk.

5. The digital broadcast receiver according to claim 1, wherein one or both of the recording media is a digital videotape.

6. A method for backing up contents recorded on a first recording medium onto a second recording medium comprising:
   storing a plurality of contents of a digital broadcast on the first recording medium;
   storing attributes of the contents on the first recording medium,
      wherein the stored attributes of the contents include a genre name of each content and a title name of each content;

automatically extracting contents from a plurality of the contents recorded out of a video-recording date-and-hour order on the first recording medium, based on a user-input attribute input by a user, wherein, when the user-input attribute is a genre name of the content, extracting means extracts the content having the same genre name as the genre name input by the user, and when the user-input attribute is a title name of the content, extracting means extracts the content having the same title name as the title name input by the user; and selecting a second recording medium;

examining for an available disk capacity of the second recording medium;

determining whether the available disk capacity of the second recording medium is sufficient for contents extracted by the extracting means;

automatically rearranging the extracted contents, recorded out of the video-recording date-and-hour order and meeting the user-input attribute, in the video-recording data-and-hour order without a user's manual operation, for recording onto the second recording medium, when the available disk capacity of the second recording medium is sufficient, wherein the video-recording date-and-hour indicates when the extracted content is recorded.

7. The backup method according to claim 6, wherein the contents recorded on a plurality of recording media are extracted according to particular genre or title input by user, rearranged according to video-recording data-and-hour and recorded onto one of plurality of recording media.

8. The backup method according to claim 6, wherein, during recording the contents onto the second recording medium, in the case that the storage capacity of the second recording medium reaches a limit, selected contents are recorded onto a third recording medium.

9. The backup method according to claim 6, further comprising:

displaying said plurality of contents recorded on said second recording medium.

10. The digital broadcast receiver according to claim 1, further comprising:

one or more back-up destination recording media adapted to store the contents, wherein the digital broadcast receiver determines an optimal one of the one or more back-up destination recording media based on available storage capacity of the one or more back-up destination recording media.

11. The digital broadcast method according to claim 6, further comprising:

determining an optimal one or more back-up destination recording media based on available storage capacity of the one or more back-up destination recording media.

* * * * *